United States Patent
d'Abreu et al.

(10) Patent No.: US 8,429,468 B2
(45) Date of Patent: Apr. 23, 2013

(54) SYSTEM AND METHOD TO CORRECT DATA ERRORS USING A STORED COUNT OF BIT VALUES

(75) Inventors: Manuel Antonio d'Abreu, El Dorado Hills, CA (US); Stephen Skala, Fremont, CA (US); Carlos Joseph Gonzalez, Monte Sereno, CA (US)

(73) Assignee: SanDisk Technologies Inc., Plano, TX (US)

( * ) Notice: Subject to any disclaimer, the term of this patent is extended or adjusted under 35 U.S.C. 154(b) by 623 days.

(21) Appl. No.: 12/695,038

(22) Filed: Jan. 27, 2010

(65) Prior Publication Data

US 2011/0185251 A1    Jul. 28, 2011

(51) Int. Cl.
*G06F 11/00* (2006.01)
*H03M 13/00* (2006.01)

(52) U.S. Cl.
USPC .......................................... 714/706; 714/759

(58) Field of Classification Search .................. 714/706, 714/758, 759, 763, 777, 802
See application file for complete search history.

(56) References Cited

U.S. PATENT DOCUMENTS

| | | | |
|---|---|---|---|
| 6,089,749 A | 7/2000 | Blaum et al. | |
| 7,290,185 B2 | 10/2007 | Kirscht | |
| 7,565,593 B2 * | 7/2009 | Dixon et al. | 714/754 |
| 7,634,706 B1 | 12/2009 | Chen et al. | |
| 7,900,125 B1 * | 3/2011 | Liu et al. | 714/799 |
| 2008/0010581 A1 | 1/2008 | Alrod et al. | |
| 2008/0195916 A1 | 8/2008 | Lee et al. | |
| 2008/0307270 A1 | 12/2008 | Li | |
| 2009/0177943 A1 | 7/2009 | Silvus et al. | |
| 2009/0292971 A1 | 11/2009 | Man et al. | |
| 2012/0072806 A1 * | 3/2012 | Tabata et al. | 714/773 |

FOREIGN PATENT DOCUMENTS

WO    2008121553 A1    10/2008

OTHER PUBLICATIONS

International Search Report and Written Opinion mailed Mar. 31, 2011 in International Application No. PCT/US2011/020533, 12 pages.
International Preliminary Report on Patentability issued Jul. 31, 2012 in International Application No. PCT/US2011/020533, 7 pages.

* cited by examiner

*Primary Examiner* — Cynthia Britt
(74) *Attorney, Agent, or Firm* — Toler Law Group, PC (57) ABSTRACT

In a particular embodiment, at a controller coupled to a memory array, a method includes receiving an indication that a first group of data bits read from the memory array includes errors that are uncorrectable by an error correction coding (ECC) engine. A count of the first group of data bits having a particular bit value may be compared to a prior count of data bits having the particular bit value. In response to determining that the count exceeds the prior count, a bit of the first group of data bits that has the particular bit value and that corresponds to a same memory cell as a corrected data bit of a second group of data bits is identified. A value of the identified bit of the first group may be changed to generate an adjusted group of data bits. The adjusted group of data bits may be provided to the ECC engine.

26 Claims, 6 Drawing Sheets

SYSTEM AND METHOD TO CORRECT DATA ERRORS USING A STORED COUNT OF BIT VALUES

FIELD OF THE DISCLOSURE

The present disclosure is generally related to data processing and storage systems, and more particularly, to detecting and correcting errors within stored or transmitted data.

BACKGROUND

Computer data storage systems typically include Error Correction Code (ECC) processes to improve data integrity. For example, ECC may be used during a read operation to determine whether accessed data bits (e.g., memory cells representing information retrieved by a processor) have incorrect states. ECC processing may increase the operational reliability of memory devices by detecting and correcting a number of erroneous bits. A threshold number of corrected bits depends upon the correction capacity of the particular ECC technique that is applied. Despite the advances afforded by ECC, it would be desirable to be able to correct errors that exceed a correction capacity of an applied ECC technique.

SUMMARY

Systems and methods are disclosed that can identify and correct errors within stored or transmitted data. A particular embodiment may track a number of errors found within data read from a word-line or from one or more pages of data from a memory. When the number of errors in the read data exceeds a capability of an error-correcting code (ECC) engine, a correction module may be used to determine one or more bits to adjust to render the data correctable by the ECC engine. For example, a read word-line may include multi-level cells (MLCs) that store multiple bits, such as a first bit in a first logical page and a second bit in a second logical page of the word-line. The first page may have errors that are uncorrectable by the ECC engine while the second page may have errors that are corrected by the ECC engine. The correction module may select one or more bits within the first page at least partially based on errors that are identified in the second page. For example, a likelihood that a particular MLC has a bit error in the first page may correlate to a number or type of bit errors the MLC has in other pages. The first page may be adjusted by changing a value of the selected bit in the first page (e.g. changed from logic "1" to logic "0" or from logic "0" to logic "1") and the adjusted first page may be re-sent to the ECC engine to determine whether the adjusted first page is correctable. The process of selecting and flipping bits in the first page can be repeated until the adjusted first page is correctable by the ECC engine.

When a memory device determines that a number of errors of a particular word-line approaches a correction capacity of its ECC engine, the device may store additional information to help identify error types and locations within the word-line. For example, when the number of errors reaches a threshold, a count of a number of identified 1's in a group of bits within the word-line may be stored. Cells within the word-line or page(s) may be grouped according to the count. For example, as the number of errors within a page increases, the number of groups may increase. The count of the number of 1's of each group of a page may be compared to a count of a number of 1's of the group saved from a previous read. This comparison may be used to determine a value and number of bits to be flipped within each group (e.g., when the read count exceeds the stored count by two, two 1's within a group would be flipped to 0's). Probability tables may be used to determine which bit(s) to flip based on which bit in the group is most likely erroneous.

The probability tables, along with the number of 1's per group, may be used to make the decision to flip bits corresponding to MLCs identified as having one or more other bit errors, such as corrected bit errors in other pages. After the selected bits are flipped, the ECC procedure may be executed to verify the decision to flip the selected bits. This process may be iterative and may terminate when the ECC engine can recover the original data, when a predetermined number of iterations have completed, or according to other termination criteria.

DETAILED DESCRIPTION

Figure 1:
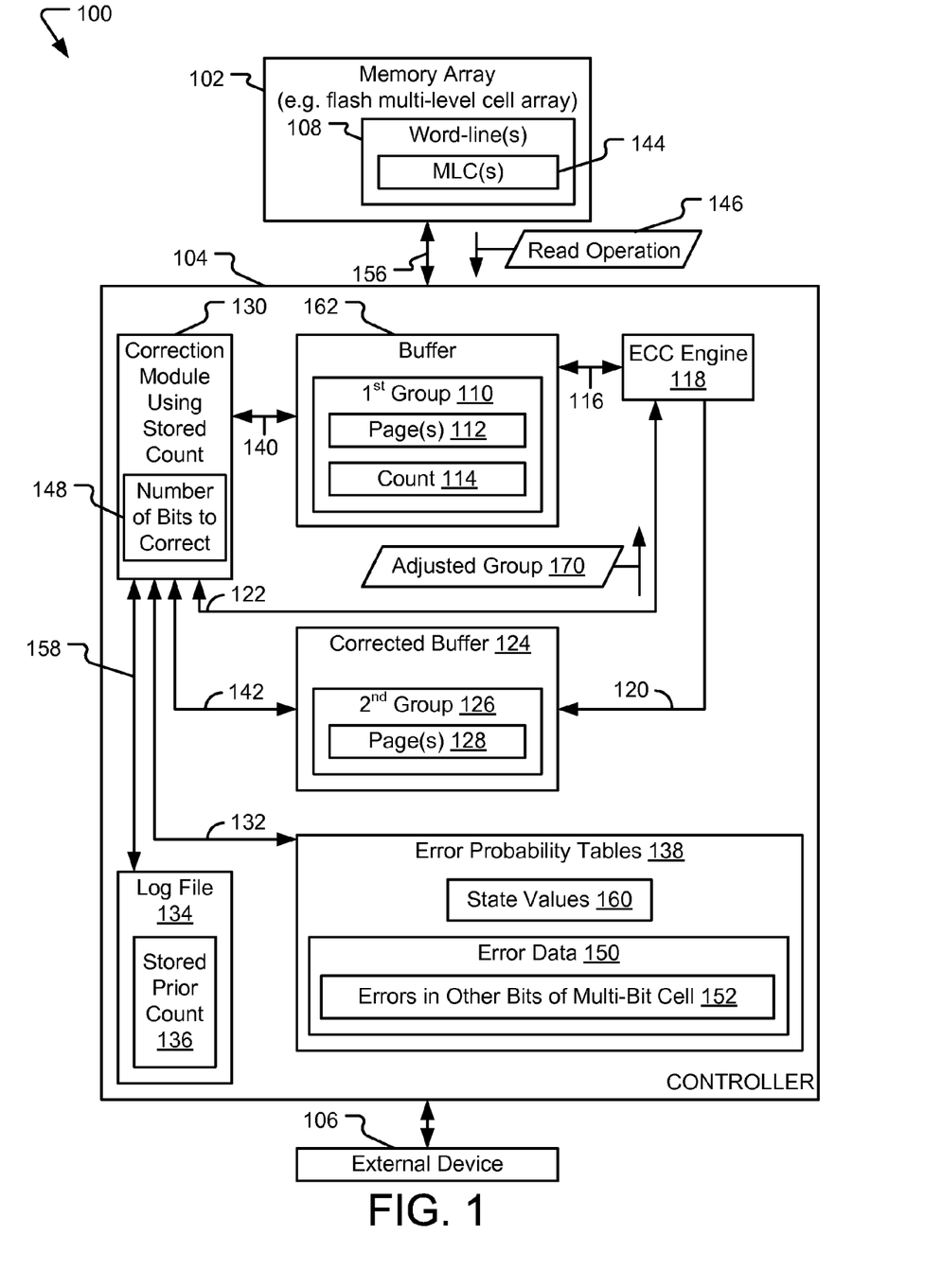
FIG. 1 is a block diagram of a particular illustrative embodiment of a system that includes a controller configured to identify and correct an error in data retrieved from a memory array.

FIG. 1 is a block diagram of a particular illustrative embodiment of a system 100 that includes a controller 104 configured to correct errors in data read from a memory array 102 (e.g., a flash multi-level cell array) that exceed a correction capacity of an ECC engine 118. The controller 104 includes a correction module 130 configured to determine one or more bits to adjust in data that is uncorrectable by the ECC engine 118.

The memory array 102 may include one or more word-line(s) 108. The word-line(s) 108 may represent a row of the memory array 102, including one or more multi-level cells (MLCs) 144 and a conductive line that is coupled to control gates of the MLCs 144 in the row of the memory array 102. The memory array 102 may transmit and receive data over a communication path 156 to the controller 104, such as via a read operation 146.

The controller 104 may be responsive to an external device 106, such as a host device, and may enable write and read access to the memory array 102. The controller 104 includes the correction module 130 configured to adjust data that is uncorrectable by the ECC engine 118 and to provide the adjusted data back to the ECC engine 118 for correction. The controller 104 also includes a buffer 162, a corrected buffer 124, a log file 134, and error probability tables 138.

The ECC engine 118 may be configured to decode and correct errors based on an error correction scheme, such Reed-Solomon (RS), Bose-Chaudhuri-Hochquenghem (BCH), Low Density Parity Check (LDPC), one or more other ECC processes, or any combination thereof. The ECC engine 118 may be configured to decode received data that has a number of errors less than or equaling an error correction capacity of the ECC engine 118. For example, the error correction capacity may be 12 bit errors per 512 bytes of encoded data. The ECC engine 118 may be configured to communicate corrected data (i.e. data having no errors and not requiring correction, or data that has been corrected by the ECC engine 118) via a path 120 to the corrected buffer 124. The ECC engine 118 may be configured to communicate data that is uncorrectable by the ECC engine 118 to the buffer 162 via a path 116.

The buffer 162 may be configured to store data that is uncorrectable by the ECC engine 118, and the corrected buffer 124 may be configured to store data that has been corrected by the ECC engine 118. For example, when the word-line 108 is read, a first group 110 of bits read from the word-line 108 may be uncorrectable by the ECC engine 118 and stored at the buffer 162, and a second group 126 of bits read from the word-line 108 may be corrected by the ECC engine 118 and stored at the corrected buffer 124.

The first group 110 may include one or more uncorrected pages 112 and the second group 126 may include one or more corrected pages 128. To illustrate, each MLC 144 may have a state that corresponds to a three-bit value, with the low-order bit of each MLC 144 assigned to a first logical page, the middle bit assigned to a second logical page, and the high-order bit assigned to a third logical page. Each page may be separately encoded and independently processed at the ECC engine 118. One or more pages of the word-line 108 may be uncorrectable by the ECC engine 118 and stored in the buffer 162 as the uncorrected pages 112, while one or more other pages of the word-line 108 may be corrected by the ECC engine 118 and stored in the corrected buffer 162 as the corrected pages 128.

The correction module 130 is configured to access the first group 110 of bits at the buffer 162 via a path 140 and is configured to flip one or more bits of the first group 110 to generate an adjusted group 170 of bits. The adjusted group 170 of bits is provided to the ECC engine 118 to be processed. If the adjusted group 170 of bits is correctable by the ECC engine 118, the corrected and decoded data may be provided to the external device 106 as a response to a request for read access to the word-line 108. If the adjusted group 170 of bits is not correctable by the ECC engine 118, one or more other bits of the first group 110 may be flipped by the correction module 130 in an iterative process to render the first group 110 of data bits correctable by the ECC engine 118.

The correction module 130 may be configured to determine a number 148 of bits of a particular value to correct in the first group 110 by comparing a count 114 of bit values of the first group 110 with a stored prior count 136 retrieved from the log file 134 via a path 158. The count 114 may be generated by the correction module 130 or by other hardware within the controller 104. The stored prior count 136 may be generated from data that is written to the word-line 108 during a prior write operation or from data previously read from the word-line 108 and corrected by the ECC engine 118.

For example, the count 114 may indicate a number of 1's in the uncorrected first group 110, and the stored prior count 136 may indicate a number of 1's that should be present in the first group 110 after all errors are corrected. When the count 114 exceeds the stored prior count 136 by one, a "0" valued bit in the first group 110 has erroneously changed to a "1" value, and the correction module 130 may select a "1" valued bit in the first group 110 to flip to a "0" value. When the stored prior count 136 exceeds the count 114, a "1" value bit has erroneously changed to a "0" value, and the correction module 130 may select a "0" valued bit in the first group 110 to flip to a "1" value. The correction module 130 may be configured to select the number 148 of bits to flip to be equal to a difference between the count 114 and the stored prior count 136. Although the count 114 and the stored prior count 136 are described as counts of "1" values, the count 114 and the stored prior count 136 may instead be counts of "0" values, and the correction module 130 may be configured to determine a number and value of bits to flip based on comparing counts of 0's.

The configuration module 130 may select particular bits in the first group 110 to be flipped according to a likelihood that the selected bits are erroneous. For example, the configuration module 130 may be configured to access at least one of the error probability tables 138 to identify at least one bit of the first group 110 for correction. The error probability tables 138 include error data 150 corresponding to whether a bit of a multi-bit cell (e.g. a MLC) is likely to be erroneous based on whether errors 152 in other bits of the multi-bit cell have been detected and/or corrected.

For example, a MLC may have a state (e.g. a threshold voltage) that is represented by a value of a first bit in the uncorrected page(s) 112 and a second bit in the corrected page(s) 128. The state of the MLC may be erroneously read due to a hardware failure (such as a broken word-line or other connection) or may be corrupted by other events (such a program disturb that is caused by a write operation to an adjacent word-line). An event that results in bit errors in the corrected page(s) 128 may also result in a bit error in the uncorrected page(s) 112. As described in FIGS. 2-3, a likelihood that a particular bit is erroneous may be correlated to a number of the errors 152 in other bits of the MLC, to a value of the particular bit, to one or more state values 160 of the MLC, to one or more other factors, or any combination thereof.

The correction module 130 may be configured to receive correction data from the ECC engine 118 indicating which bits of the second group 126 were corrected. The correction module 130 may be configured to locate each bit of the first group 110 that shares a common MLC with a corrected bit of the second group 126. The correction module 130 may initiate a lookup operation at the error probability tables 138 for each located bit in the first group 110 to retrieve data indicating a likelihood that the bit is erroneous.

For example, the correction module 130 may access the corrected buffer 124 via a path 142 to retrieve bit values of one or more bits in the second group 126 sharing a MLC with a particular bit of the first group 110. The correction module 130 may process the retrieved bit value(s) and perform a lookup operation at the error probability tables 138 using a number of corrected bits of the MLC, one or more bit values of the MLC, or other information to locate an entry at the error probability tables 138. An error likelihood value of the located entry at the error probability tables 138 may be returned to the correction module 130 and associated with the particular bit of the first group 110.

The correction module 130 may select the determined number 148 of bits to correct in the first group 110 by selecting bits indicated as having the highest error likelihood values. For example, where the number 148 of bits to correct is determined to be N, the N bits corresponding to the N highest error likelihood values may be selected. The correction module 130 may read the first group 110 of bits, flip the selected bits to generate the adjusted group 170, and initiate a decode of the adjusted group 170 at the ECC engine 118.

During operation, a read operation may be performed of the word-line 108. The ECC engine 118 may successfully decode each logical page of the word-line 108 and may generate correction data indicating a number of corrected errors of each page. The correction module 130 may compare the number of corrected errors to a threshold number of errors to determine whether the word-line 108 or one or more pages of the word-line 108 are in danger of exceeding the correction capability of the ECC engine 118 in a subsequent read operation.

In response to the number of corrected errors satisfying the threshold, the correction module 130 may logically divide the word-line 108 or pages of the word-line 108 into one or more groups and store a 1's count of each group in the log file 134. Thus, the counts stored in the log file correspond to a corrected, error-free representation of the data (i.e. after successful correction by the ECC engine 118). The number of groups may be determined to reduce a possibility that both a one-changed-to-zero error and a zero-changed-to-one error occur in a same group. For example, if the correction capability of the ECC engine 118 is 12 bits per 512-byte page, each page may be logically divided into twelve or more groups. During a later read operation, when more than twelve errors in the page render the page uncorrectable by the ECC engine 118, each group may be statistically likely to have only one error. Although illustrated as stored within the controller 104, the log file 134 may alternatively be stored at the memory array 102.

After storing the counts corresponding to number of bits having a particular value within each group with respect to the word-line 108 or one or more pages of the word-line 108, a subsequent read operation at the word-line 108 may return a page of data having a greater number of errors than the correction capacity of the ECC engine 118. The ECC engine 118 may generate a signal, such as a non-convergence error signal, and in response, one or more uncorrectable pages of the read data may be stored at the buffer 162. Corrected pages of the word-line 108 may be stored at the corrected buffer 124. Error location data corresponding to the corrected data may also be generated by the ECC engine 118 and may be stored at the corrected buffer 124.

The correction module 130 may retrieve stored counts of 1's in groups of data corresponding to an uncorrectable page, such as the stored prior count 136. The correction module 130 may determine a number of bits and a bit value to flip for individual groups of data stored at the buffer 162 by comparing the recent count (such as the count 114) of each group to the stored prior count of the group. For each group that is indicated as having one or more bit errors to be corrected, the error correction module 130 may select one or more bits to flip by accessing the error probability tables 138 and selecting bits indicated as most likely erroneous based on the probability table lookup results.

The correction module 130 may generate the adjusted group 170 and signal for the ECC engine 118 to initiate a decode operation including the adjusted group 170. For example, the correction module 130 may generate an adjusted page of data that matches the data in the buffer 162 with the selected bits for each group flipped (i.e, the adjusted page contains one or more adjusted groups in a page format). The adjusted page of data may be sent to the ECC engine 118. As another example, the correction module 130 may flip the selected bits at the buffer 162 and instruct the ECC engine 118 to read the buffer 162 for decoding (e.g. the adjusted group 170 is generated within the buffer 162).

When a sufficient number of erroneous bits have been flipped, the remaining number of errors in the adjusted data may be within the error correction capacity of the ECC engine 118, and decoding may be completed. The ECC engine 118 may generate data indicating the location of corrected errors in the adjusted data. The correction module 130 may update the logical partitioning of the page into groups based on the total number of errors (bits flipped by the module 130 and bits corrected by the ECC engine 130), the location of the errors, the error values, or a combination thereof. The correction module 130 may generate new counts of 1's values for the new groups and store the grouping information and count information in the log file 134 for use with a next read of the word-line 108.

As a result, the word-line 108 may continue to be used even after data read from the word-line 108 is no longer correctable by the ECC engine 118. Thus, the memory array 102 may have a longer useful life as compared to systems that do not use the error correction module 130 and that are limited by the correction capacity of the ECC engine 118. Alternatively, or in addition, the controller 104 may be designed to maintain an effective error correction capacity of a more powerful ECC engine by using the correction module 130 with a less-powerful ECC engine 118, and may operate with reduced power consumption, device size, and manufacturing cost as compared to the more powerful ECC engine.

Figure 2:
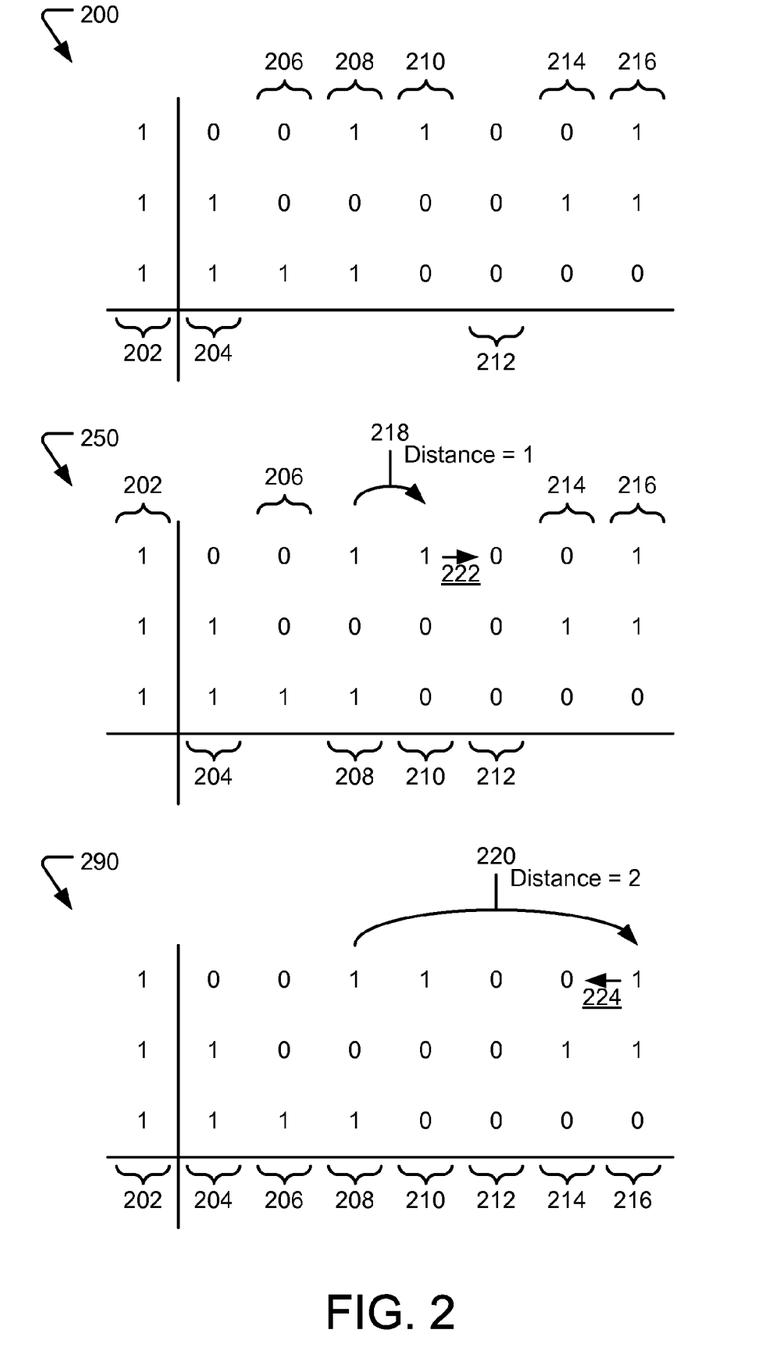
FIG. 2 is a general diagram illustrating a memory cell having states that are corrected using error correction code calculations and a probability table lookup to flip an erroneous bit.

FIG. 2 shows variants of a memory cell analyzed for error identification and correction. The memory cell may include an MLC, such as the MLC 144 of the memory array 102 of FIG. 1. FIG. 2 shows different variants 200, 250, and 290 of the memory cell as may be read from a memory array. The memory cell is illustrated as including three bits arranged in a column format including a top bit, a middle bit, and a bottom bit for simplicity of illustration. The top bit may be part of a first page, the middle bit may be part of a second page, and the bottom bit may be part of a third page. The second and third pages may be corrected using an ECC engine, while the first page may be uncorrectable by the ECC engine.

The cell variant 200 includes different states 202, 204, 206, 208, 210, 212, 214, and 216 having different combinations of the top, middle, and bottom bit values. Each state 202-216 may correspond to a different threshold voltage range of the memory cell. The memory cell may be originally read as "101", corresponding to the state 208. The state 208 may be stored as a "before" value.

The first page including the top bit of the memory cell may include uncorrectable errors. The cell variants 250 and 290 illustrate two scenarios that may occur after the second and third pages have been corrected by an ECC engine. For example, the cell variant 250 includes the states 202-216. The corrected state of the cell variant 250 may include "100", which corresponds to the state 210. Thus, correction of the third page results in the third bit changing from a "1" to a "0," while the second bit is unchanged. The state 210 may be stored as an "after" value. The change of state from 208 to 210 may represent a movement of one state position. An arrow 218 illustrates the movement from the "before" state to the "after" state. The movement corresponds to a Hamming distance of one.

In contrast, the corrected state of the cell variant 290 may include "110," which corresponds to state 216. Thus, in the variant 290 correction of the third page results in the third bit changing from "1" to "0," and correction of the second page results in the second bit changing from "0" to "1." The state 216 may be stored as an "after" value. The change of state from 208 to 216 may represent a movement of two state positions. An arrow 220 illustrates the movement from the "before" state to the "after" state. The movement corresponds to a Hamming distance of two.

The values of the Hamming distances may be used as inputs to address error probability tables to determine a probability that the first bit is incorrect. For example, the Hamming distance of one, which corresponds to the cell variant 250, may be used to lookup a value within an error probability table, such as the error probability table 138 of FIG. 1. The count of 1's for the group that includes the cell, such as the count 114 of FIG. 1, may also be used as a lookup factor. A controller, such as the controller 104 of FIG. 1, may use the error probability table inputs of the ECC calculation (e.g., the Hamming distance of one) and the count to determine that a corrected state of the cell should be "000". Arrow 222 shows a potential flipping of the cell state to a correct state 212.

In another example, the Hamming distance of two, which corresponds to the cell variant 290, may be used to lookup a value within an error probability table, such as the error probability table 138 of FIG. 1. The error probability table may also use as a lookup factor the count of 1's for the group that includes the cell, such as the count 114 of FIG. 1. A controller, such as the controller 104 of FIG. 1, may generate error probability table inputs including the ECC calculation (e.g., the Hamming distance of two) and the count to determine that a corrected state of the cell should be "010". Arrow 224 shows a potential flipping of the top bit to a correct state 214.

The cell variants 250 and 290 thus illustrate examples of a memory cell having states that are corrected using ECC calculations and a probability table lookup to flip an erroneous bit. Data provided to an error probability table, such as the error probability table 138 of FIG. 1, may be indexed by a Hamming distance from a read value to a partially corrected value. An ECC scheme with relatively small processing requirements may be used and errors can be quickly identified. The finally determined corrected state may be used to improve data integrity.

Figure 3:
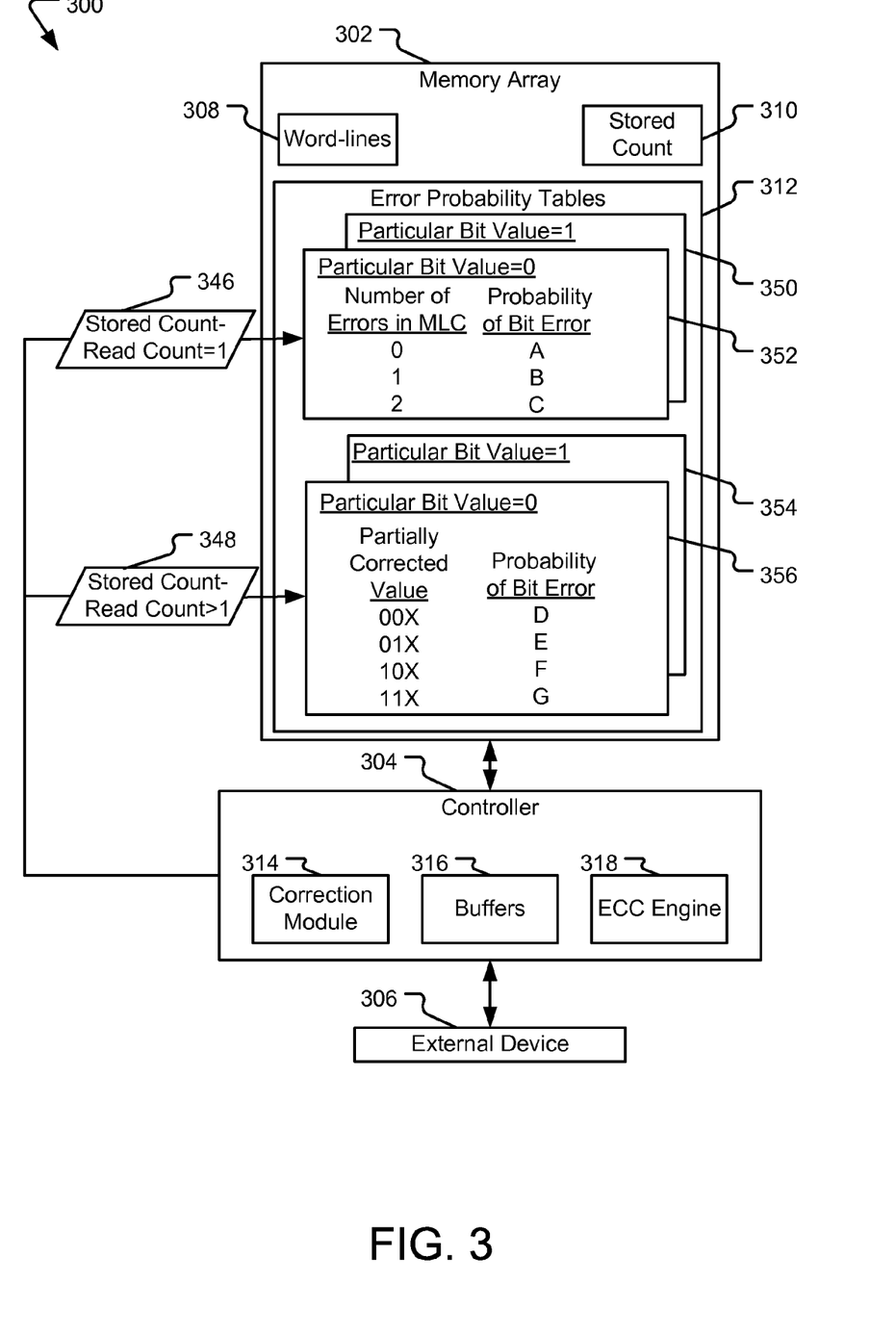
FIG. 3 is a block diagram of a particular embodiment of a system including a memory array that includes a read count and error probability tables.

FIG. 3 illustrates another particular embodiment of a system 300 configured to identify and correct data errors. The system 300 is similar to the system 100 of FIG. 1; however, a stored count 310 and error probability tables 312 are included within a memory array 302. FIG. 3 illustrates a first, stored count (e.g., stored count 310) that is stored within the memory array 302, while FIG. 1 illustrates a first, stored count (e.g., stored prior count 136) that is stored within the controller 104. As shown in FIG. 3, the memory array 302 is coupled to a controller 304 and includes word-lines 308. The controller 304 may include similar functionality to the controller 104 of FIG. 1. The controller 304 is coupled to an external device 306. The external device 306 may be the same as the external device 106 of FIG. 1.

The memory array 302 includes error probability tables 312. The error probability tables 312 may be the same as the error probability tables 138 of FIG. 1. The error probability tables shown in FIG. 3 include lookup tables 350, 352, 354, and 356.

The controller 304 may include a correction module 314, buffers 316, and an ECC engine 318. The correction module 314 may be the same as the correction module 130 of FIG. 1. The buffers 316 may correspond to the buffer 162 and the corrected buffer 124 of FIG. 1. The ECC engine 318 may be the same as the ECC engine 118 of FIG. 1.

The lookup table 350 may be used to determine a probability that a particular bit of an MLC is erroneous based on a number of other detected errors of the MLC. For example, where the MLC stores three bit values, each corresponding to a different page, and two pages are correctable and a third page is not correctable, a probability of an error in the particular bit in the third page may be correlated to a number of errors detected in the other two bits of the MLC.

The lookup table 350 may be used where a difference of the first, stored count 310 and a second, read count equals one, as indicated by path 346, and where the particular bit value equals one. The lookup table 352 may be used where a difference of the first, stored count 310 and the read count equals one, as indicated at 346, and where the particular bit value equals zero. The lookup table 352 includes a column indicating a number of corrected errors in the MLC. The column is correlated to a column indicating a probability of bit error.

For example, where zero errors have been detected in the MLC, a probability that a particular bit is erroneous may correspond to a value illustrated as "A." Where one error has been detected in the MLC, a probability that the particular bit is erroneous may correspond to a value illustrated as "B." In another example, when two errors have been detected in the MLC, a probability that the particular bit is erroneous may correspond to a value illustrated as "C." For example, the value "A" may be less than of the value "B," which may be less than the value "C."

The lookup table 354 may be used where a difference of the first, stored count 310 and the read count is greater than one, as indicated at 348, and where the particular bit value equals one. The lookup table 356 may be used where a difference of the first, stored count 310 and the read count is greater than one, as indicated at 348, and where the particular bit value equals zero. The lookup table 356 includes a column indicating a partially corrected value. The column is correlated to a column indicating a probability of bit error.

To illustrate, in a three-bit MLC, a probability that a particular bit is erroneous may correspond to a corrected value of the other two bits. For example, where a corrected value of a first bit and a second bit of a three-bit MLC are both "0," a probability that a particular bit is erroneous may correspond to a value illustrated as "D." Where a corrected value of a first bit is "0" and a corrected value of a second bit is "1," a probability that a particular bit is erroneous may correspond to a value illustrated as "E." In another example, where a corrected value of a first bit is "1" and a corrected value of a second bit is "0," a probability that a particular bit is erroneous may correspond to a value illustrated as "F." Where a corrected value of a first bit and a second bit of a three-bit MLC are both "1," a probability that a particular bit is erroneous may correspond to a value illustrated as "G." Because the tables 354 and 356 indicate likelihood of bit error as a function of correct bit values and read bit values of a single MLC, the tables 354 and 356 may reflect a likelihood of an error based on a state of the MLC (e.g. based on a threshold voltage of the MLC).

In operation, the controller 304 may receive an indication that data bits read from the memory array 302 include errors that cannot be corrected by the ECC engine 318. The controller 304 may enable the correction module 314 to change a value of the data bits based upon a lookup value of the error probability tables 312, and based upon the stored count 310. The controller 304 may iteratively flip bits until the ECC engine 318 can correct the data bits.

Although FIG. 3 illustrates lookup tables 350 and 352 based on a number of errors and lookup tables 354 and 356 based on partially corrected values, in other embodiments, other criteria may be used as a basis to determine or estimate probability of error. For example, all of the error probability tables 312 may be indexed by partially corrected values, or all of the error probability tables 312 may be indexed by a number of detected errors. As another example, the error probability tables 312 may be independent of a difference between the first, stored count 310 and the read count. Also, although the error probability tables 312 are illustrated as corresponding to a three-bit value (e.g., eight states of an MLC), a number of bits represented by a state of a memory cell of another embodiment may be less than three bits or greater than three bits.

One or more of the illustrated values "A," "B," etc. may be determined based on empirical data, based on theoretical computations, based on one or more other factors such as computational simplicity and table storage size, or any combination thereof. As such, although the illustrated values "A," "B," etc. are described as corresponding to a probability of a bit error, in other embodiments one or more of the illustrated values "A," "B," etc. may not correspond to actual probabilities and may instead indicate a relative likelihood of error or a prioritization scheme of checking MLCs for potential errors.

Figure 4:
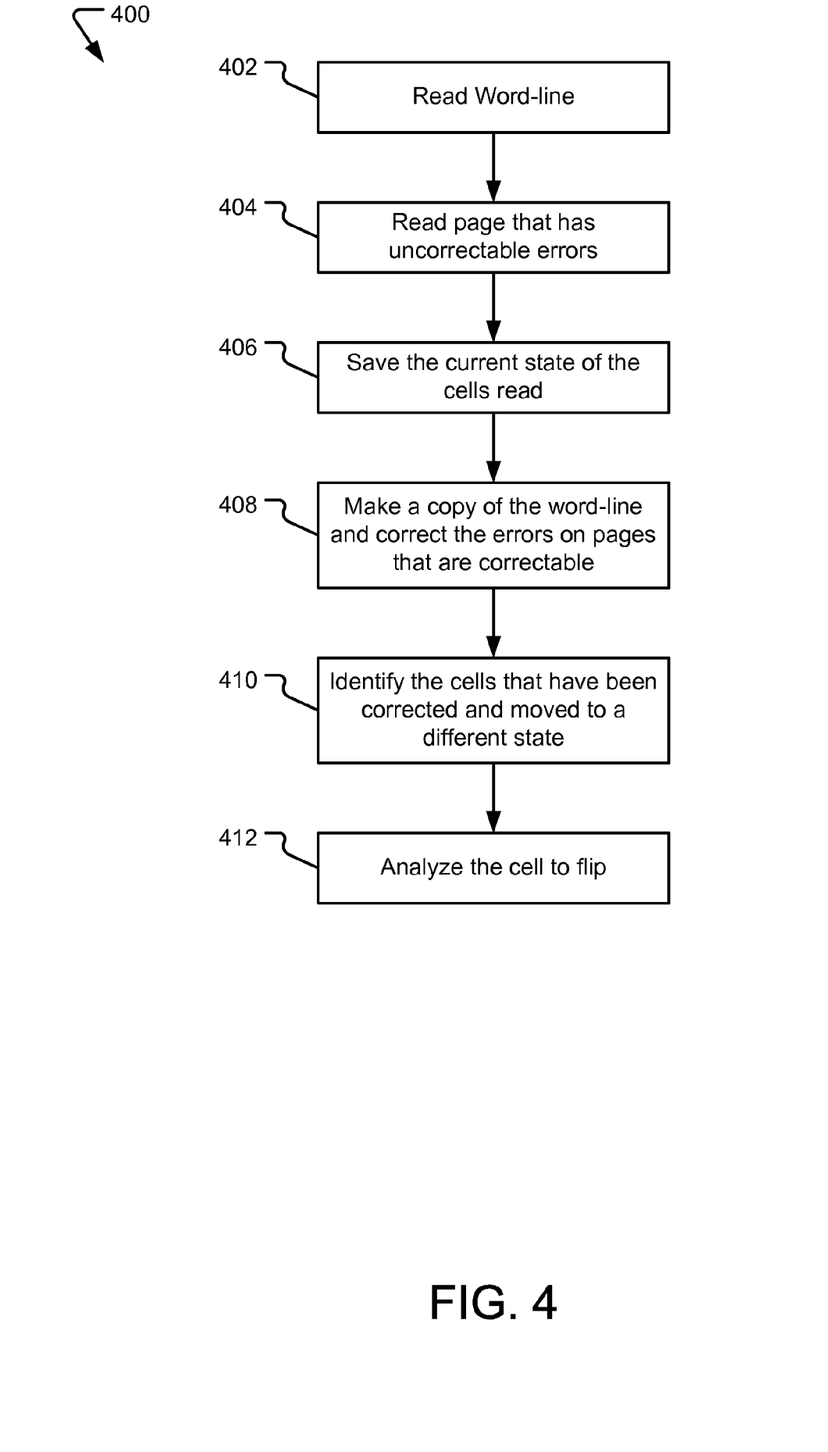
FIG. 4 is a flow diagram of a particular embodiment of a method of analyzing and correcting errors within a memory cell.

FIG. 4 is a flow diagram of a particular embodiment of a method of analyzing and correcting errors within memory cells. The method, generally designated 400, includes reading a word-line, at 402. For example, the controller 104 of FIG. 1 may read the word-line(s) 108 from the memory array 102.

The method 400 may include reading a page that includes uncorrectable errors, at 404. For example, the controller 104 of FIG. 1 may read the page 112 from the memory array 102 during the read operation 146.

The current state of the read cells may be saved, at 406. This current state may be labeled as a "before" state. For example, the first group 110 and the count 114 of FIG. 1 may be stored within the buffer 162.

A copy of the word-line may be made, and errors on pages that are correctable may be corrected, at 408. A copy of the corrected data may be labeled "after". For example, the ECC engine 118 of FIG. 1 may correct errors on other pages of the word-line(s) 108 and store the corrected data as the page(s) 128.

The method 400 may include identifying cells that have been corrected and moved to a different state, at 410. For example, the correction module 130 of FIG. 1 may identify MLCs 144 in the page(s) 128 that have been corrected and moved to a different state. Information regarding the corrected cells may be provided to the correction module 130 by the ECC engine 118.

The particular cell to flip may be analyzed, at 412. For example, the correction module 130 of FIG. 1 may analyze an MLC 144 by determining a number of bits to correct of a group of bits that the ECC engine 118 cannot correct. The correction module 130 may conduct a lookup operation in a probability table to determine a MLC bit most likely to be incorrect. The correction module 130 may flip the determined bit and send the data to the ECC engine 118. Should the group of bits still be uncorrectable, the correction module 130 may select a next bit to be flipped based upon a determined probability associated with the next bit.

Figure 5:
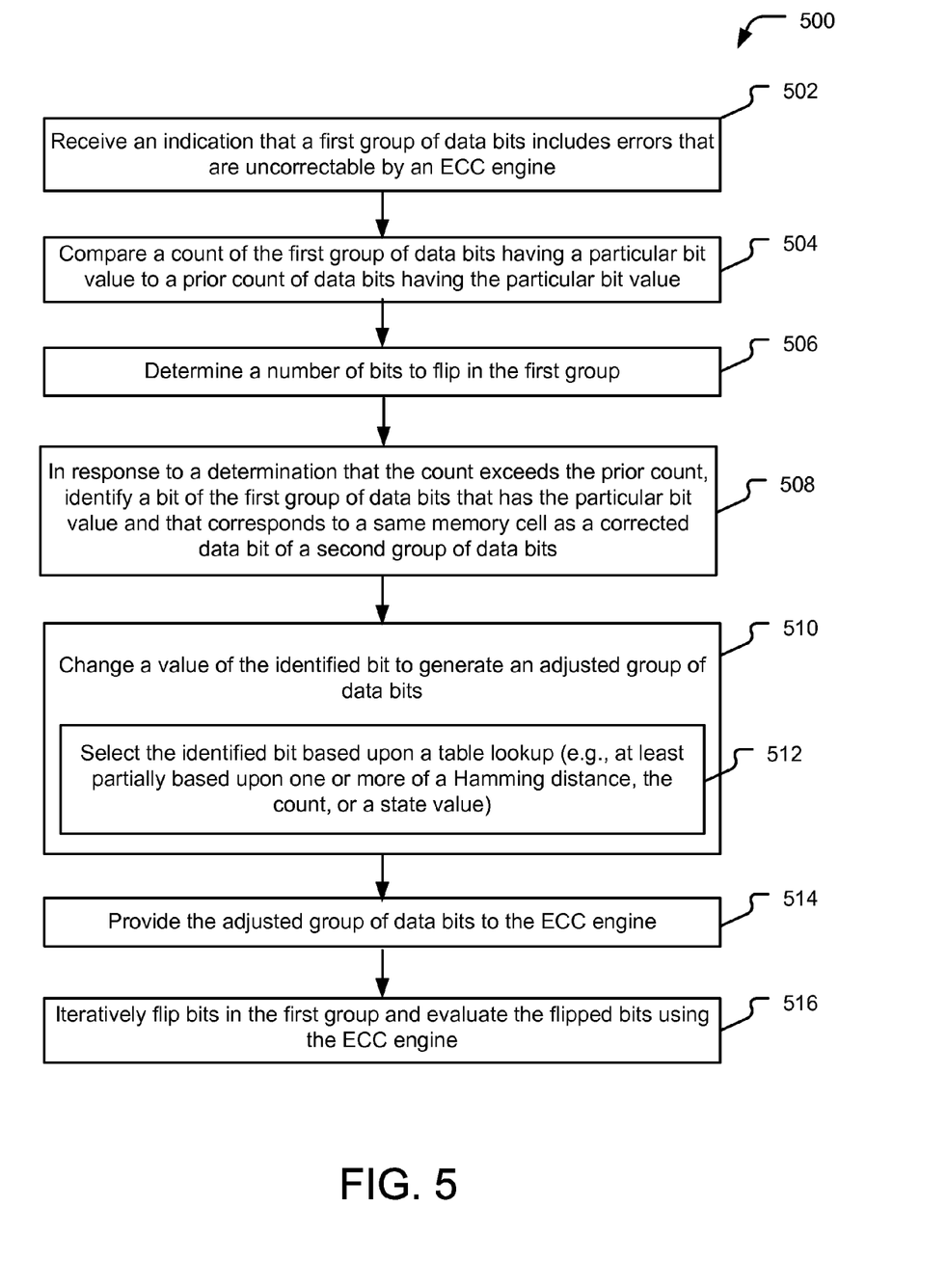
FIG. 5 a flow diagram of another particular embodiment of a method of analyzing and correcting errors within a memory cell.

FIG. 5 is a flow diagram of an embodiment of a method of correcting errors within memory cells. The method, generally designated 500, may be performed at a controller coupled to a memory array, such as the controller 104 of FIG. 1. The method 500 includes receiving an indication that a first group of data bits read from the memory array includes errors that are uncorrectable by an ECC engine, at 502. For example, the controller 104 of FIG. 1 may determine from the read operation 146 that the first group 110 includes errors that are uncorrectable by the ECC engine 118. To illustrate, the correction module 130 of FIG. 1 may receive a signal from the ECC engine 118 indicating that the ECC engine 118 could not correct one or more page(s) 112 of the first group 110. The correction module 130 may also receive a signal from the ECC engine 118 indicating errors occurring in one or more page(s) 128 of the second group 126 that were successfully corrected by the ECC engine 118.

A count of the first group of data bits having a particular bit value may be compared to a prior count of data bits having the particular bit value, at 504. For example, the correction module 130 of FIG. 1 may receive the count 114 via the communications path 140. The correction module 130 may receive the stored prior count 136, such as by accessing the log file 134, locating the stored prior count 136 corresponding to the first group 110 (e.g. by comparing a memory address of the first group 110 with a memory address corresponding to the stored prior count 136), and retrieving the stored prior count 136 from the log file 134. The correction module 130 may compare the count 114 to the stored prior count 136, such as by performing a subtraction operation, a bit-wise comparison operation, or another operation to determine a difference between the count 114 and the stored prior count 136. The particular bit value may be "0" and the count 114 may correspond to a number of "0" values of the first group 110. Alternatively, the particular bit value may be "1" and the count 114 may correspond to a number of "1" values of the first group 110.

A number of bits to flip in the first group may be determined, at 506. For example, the correction module 130 of FIG. 1 may determine the number 148 of bits to correct as a result of subtracting the count 114 from the stored prior count 136 and assigning the result of the subtraction as the number of bits to correct 148. A negative value may indicate that one or more bits should be flipped to have the particular value, while a positive value may indicate that one or more bits that have the particular value should be flipped. Alternatively, one or more other processes may be used to determine a sign and magnitude of a difference between the count 114 and the stored prior count 136.

In response to determining that the count exceeds the prior count, a bit of the first group of data bits that has the particular bit value and that corresponds to a same memory cell as a corrected data bit of a second group of data bits may be identified, at 508. For example, the controller 104 of FIG. 1 may identify, in response to the count 114 exceeding the stored prior count 136, that a bit of the first group 110 corresponds to the same memory cell as a corrected bit of the second group 126.

To illustrate, the ECC engine 118 may generate data indicating bits of the second group 126 that were corrected by the ECC engine 118. The correction module 130 may receive the data from the ECC engine 118 and may locate one or more bits of the first group 110 that correspond to a corrected bit of the second group 126. For example, the MLC(s) 144 may have states that correspond to three bit values, each bit value associated with a same bit location on separate pages (e.g., as described with respect to FIG. 2). The bit location of a corrected error in one or more of the page(s) 128 may be identified and a bit within the page(s) 112 at the bit location of the corrected error may be identified as corresponding to a same MLC as the corrected error. In other embodiments, the correction module 130 may identify the bit of the first group 110 according to one or more other mappings between corresponding bits of the first and second groups 110, 124 associated with a same MLC 144.

Multiple bits of the first group 110 may be located that correspond to MLCs of corrected errors in the second group 126. The correction module 130 of FIG. 1 may perform multiple lookup operations at the error probability tables 138.

Each lookup operation may return a likelihood value or probability that a corresponding bit of the first group 110 is erroneous. The correction module 130 may perform a lookup operation of each located bit of the first group 110 corresponding to a same MLC as a corrected error in the second group 126 and identify one or more largest values returned by the lookup operations. A bit of the first group 126 associated with a largest returned value (e.g. the bit indicated as most likely erroneous according to the probability tables 138) may be identified.

For example, the correction module 130 may generate a table or buffer of entries including bit locations in the first group 110 corresponding to corrected errors in the second group 126 and including results of a table lookup for each of the bit locations. Each table lookup may involve determining indexing data, such as illustrated in FIG. 3. For example, the correction module 130 may compare a bit location in the first group 110 to bits of the second group 126 corresponding to a same MLC. The correction module 130 may determine based on data generated by the ECC engine 118 how many of the corresponding bits (of the same MLC) in the second group 126 were corrected, and may supply the result during a lookup operation to a probability table, such as the table 350 or 352 of FIG. 3. As another example, the correction module 130 may access the corrected buffer 124 to read corrected bit values of the corresponding bits (of the same MLC) of the second group 126 and may provide the corrected bit values during a lookup operation to a probability table, such as the table 354 or 356 of FIG. 3.

Continuing the example, after populating the table or buffer with entries corresponding to bit locations and associated results of table lookups, a largest table lookup result may be located. For example, the results may be sorted based on table lookup result value and a first sorted entry may be identified. As another example, the table or buffer may be traversed and a largest table lookup result value may be located. Although in the present example a single bit is identified based on a largest table result value, in other embodiments multiple bits (i.e. N bits) may be identified based on the N largest table lookup result values that are located. For example, a value of N may be equal to the number of bits to be flipped.

A value of the identified bit of the first group may be changed to generate an adjusted group of data bits, at 510. For example, the correction module 130 may change an identified bit to generate an adjusted group. To illustrate, the correction module 130 may access the buffer 162 and generate a copy of bit values from the first group 110. The correction module 130 may locate a bit location corresponding to the identified bit of the first group 110 in the copy of the bit values. When the identified bit has a "0" value, the correction module 130 may replace the "0" value with a "1" value to generate the adjusted group 170 of data bits. When the identified bit has a "1" value, the correction module 130 may replace the "1" value with a "0" value to generate the adjusted group 170 of data bits. If multiple bits are identified, the correction module 130 may perform a replacement operation for each identified bit to generate the adjusted group of data bits.

The identified bit may be selected based upon a table lookup (e.g., at least partially based upon one or more of a Hamming distance, the count, or a state value), at 512. To illustrate, the table lookup may be at least partially based upon a Hamming distance when a number of errors in an MLC is used to determine a likelihood of error, as described with respect to the tables 350 and 352 of FIG. 3. As another example, the table lookup may be at least partially based upon the count by using the count as a parameter to select a probability table to access, as described with respect to the path 346 and the path 348 of FIG. 3. As yet another example, the table lookup may be at least partially based upon a state value, such as based upon a partially corrected bit value of an MLC cell in conjunction with the particular bit value, as described with respect to the tables 354 and 356 of FIG. 3. The identified bit may be selected as having a largest table lookup result of the located bits.

The adjusted group of data bits may be provided to the ECC engine, at 514. For example, the correction module 130 of FIG. 1 may communicate the adjusted group 170 to an input of the ECC engine 118 via the path 122. The correction module 130 may generate or otherwise cause one or more control signals to be provided to the ECC engine 118 to initiate a decode operation using the adjusted group 170 of data bits as input data. The ECC engine 118 may initiate the decode operation and may generate a corrected output or a failure indicator. When the ECC engine 118 generates a corrected output, a sufficient number of errors of the first group 110 have been corrected in the adjusted group 170 to satisfy a correction capability of the ECC engine 118.

Upon receipt of a failure indicator, bits in the first group may be iteratively flipped until the ECC engine determines that the first group is correctable, at 516. For example, the ECC operation on the adjusted group of data bits may result in a failure indicator being provided to the correction module 130 of FIG. 1. In response, the correction module 130 may select one or more additional or alternate bits to flip to generate another adjusted group of data bits to be evaluated using the ECC engine 118.

For example, where the correction module 130 identifies a single bit per iteration to flip (i.e. to replace a single "1" value with a "0" value or to replace a single "0" value with a "1" value), the correction module 130 may return a most recently flipped bit to its original value and flip a next most likely erroneous bit of the first group 110 to generate a next adjusted group of data bits to be tested at the ECC engine 118. The next most likely erroneous bit may be identified according to lookup table results, such as previously described. The resulting next adjusted group of data bits may be provided to the ECC engine 118 as a next iteration of an iterative process that may terminate when the ECC engine can correct the adjusted group of data bits on any particular iteration. Other termination criteria of the iterative process can include: all located bits have been tested and each resulting adjusted group has failed to be decoded; all bits of the first group 110 have been tested (i.e. including bits that do not correspond to a same cell as a corrected error of the second group 126) and each resulting adjusted group has failed to be decoded; a predetermined number of iterations have been completed; one or more other termination criterion; or any combination thereof.

Figure 6:
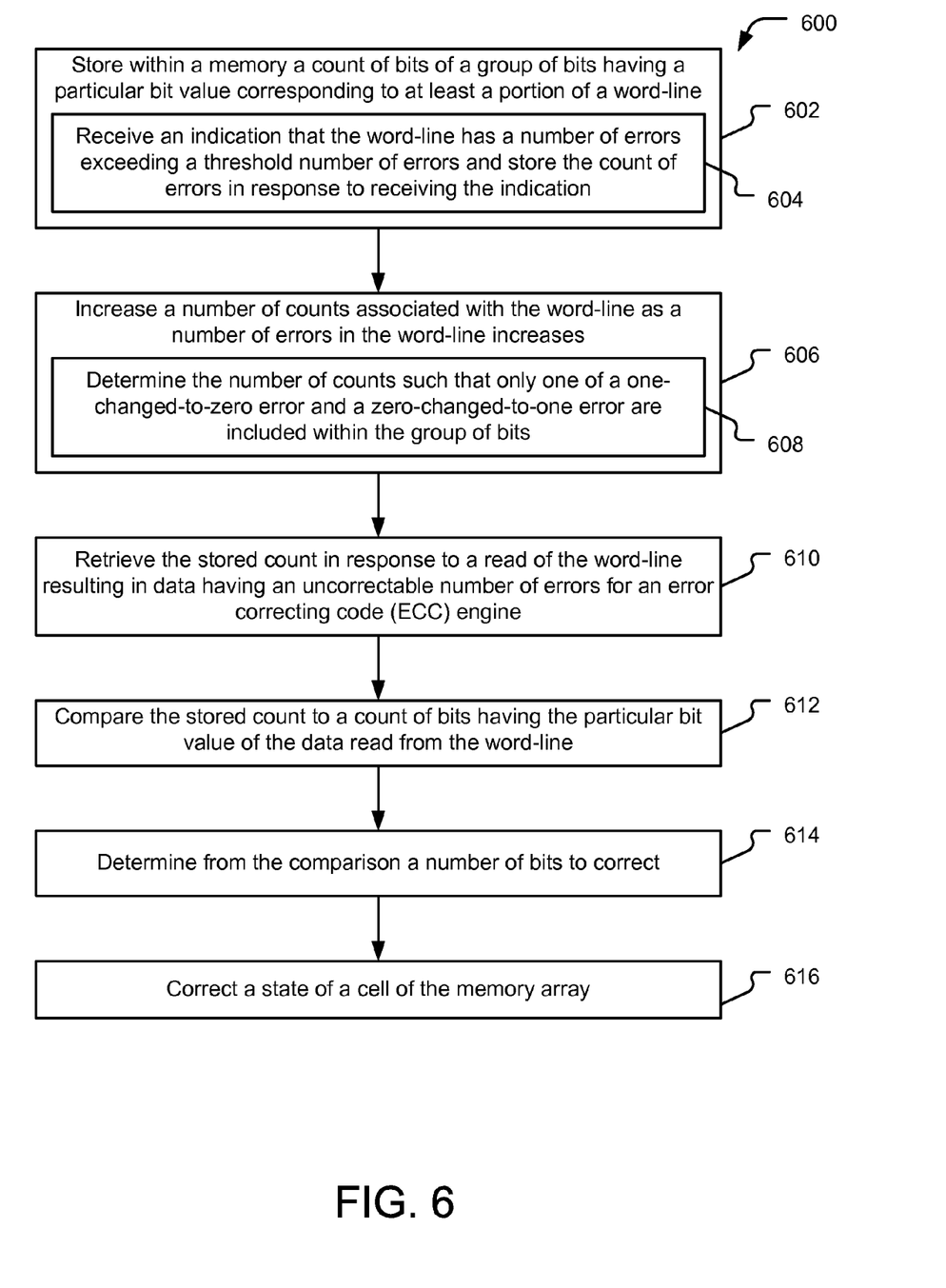
FIG. 6 is a flow diagram of a particular embodiment of a method of correcting errors within memory cells based upon a table lookup.

FIG. 6 is a flow diagram of an embodiment of a method of correcting errors within memory cells based upon a table lookup. The method, generally designated 600, may be performed at a controller coupled to a memory array, such as the controller 104 of FIG. 1. The method 600 includes storing a first count of bits of a group of bits that are identified as having a particular bit value, the group of bits corresponding to at least a portion of a word-line of the memory array, at 602. For example, the count 114 of FIG. 1 may correspond to the word-line 108 and may be stored within the log file 134 as the stored prior count 136 for later retrieval in case a data read of the word-line 108 is uncorrectable by the ECC engine 118. The particular bit value may be "0" and the count 114 stored within the buffer 162 may correspond to a number of "0" values of the first group 110. Alternatively, the particular bit value may be "1" and the count 114 stored within the buffer 162 may correspond to a number of "1" values of the first group 110. While the buffer 162 is illustrated in FIG. 1 as including the count 114, a count may alternatively be stored within any suitable memory in communication with the correction module 130 or comparable logic device.

The first count of bits may be stored at the controller or at the memory array. Although the stored prior count 136 is illustrated in FIG. 1 as within the log file 134, in other embodiments the stored count may not be stored within a log file. Although FIG. 1 shows the stored prior count 136 stored at the controller 104, in other embodiments the stored count is not stored at the controller and may instead be stored at the memory array 102. For example, the first count may be stored in a log file within a memory array.

An indication may be received that the word-line has a number of errors exceeding a threshold number of errors, and the count may be stored in response to receiving the indication, at 604. For example, the controller 104 of FIG. 1 may store the prior count 136 in response to receiving an indication from the ECC engine 118 that the word-line 108 has an excessive number of errors. The ECC engine 118 may indicate a number of errors, and the correction module 130 may determine that the word-line 108 is likely to soon exceed the correction capacity of the ECC engine 118. As the correction capacity is approached, the controller 104 may initiate storing the prior count 136 for one or more groups of data bits within the word-line 108. A flag or other designator may be set within the memory array 102 or the controller 104 to indicate that the word-line 108 has a large number of errors or is associated with a stored count. As an example, the correction module 130 of FIG. 1 may receive a signal from the ECC engine 118 indicating that a number of errors of the word-line 108 has been detected by the ECC engine 118 that exceeds a threshold. The corrected data corresponding to the word-line 108 may be logically partitioned into one or more groups of data bits and a count generated for each group. The counts associated with the word-line 108 may be stored at the log file 134 to be retrieved when data is read from the word-line 108 during a later read operation.

A number of counts associated with the word-line may be increased as a number of errors in the word-line increases, at 606. For example, a large number of errors in a word-line 108 of FIG. 1 may increase a number of counts 114. To illustrate, the correction module 130 may receive the number of errors detected by the ECC engine 118 or may determine the number based upon a difference between the count 114 and the stored prior count 136 for the word-line 108. The correction module 130 may use the number of errors to determine a number of counts to be stored within the buffer 162. As the number of errors within the word-line 108 increases, the number of counts may increase. Increasing the number of counts may reduce the probability that bit values represented by the state of multiple cells within a single group will erroneously flip.

The number of counts may be determined such that only one of a one-changed-to-zero error and a zero-changed-to-one error are included within the group of bits, at 608. For example, the number of counts 114 of FIG. 1 may be determined based on the number of errors detected by the ECC engine 118 such that only one of a one-changed-to-zero error and a zero-changed-to-one error are included within the group 110. To illustrate, a read operation 146 of the word-line 108 may result in one or more groups (e.g., the group 110) having a count that differs from the group's stored count (e.g., the stored count 136) by more than one. The number of groups that have a count that exceeds the corresponding stored count by two or more and the number of groups that have a count that is less than the stored count by two or more may be determined and added to the current number of groups to determine a larger number of groups to logically partition the word-line 108. The new set of groups corresponding to the word-line 108 may be determined by partitioning the word-line 108 into substantially equally sized groups of data bits, each group having an associated count of "1's" or "0's". As another example, each group having a count that differs from its stored count by two or more may be partitioned into two or more smaller groups, resulting in non-uniform group sizes for the word-line 108, but providing finer granularity in portions of the word-line 108 that have more errors than other portions.

The first count may be retrieved in response to a read of the word-line resulting in data that is uncorrectable by an ECC engine, at 610. For example, the stored prior count 136 of FIG. 1 may be retrieved in response to the read operation 146 of the word-line 108 resulting in data having an uncorrectable number of errors for the ECC engine 118. For example, the correction module 130 of FIG. 1 may receive a signal from the ECC engine 118 indicating that the ECC engine 118 could not correct one or more page(s) 112. In response, the correction module 130 may retrieve the stored prior count 136. To illustrate, the correction module 130 may access the log file 134, locating the stored prior count 136 corresponding to the first group 110. For example, the correction module 130 may compare a memory address of the first group 110 with a memory address corresponding to the stored prior count 136 and retrieve the stored prior count 136 from the log file 134. The first count may be compared to a second count of bits having the particular bit value, the second count of bits determined based on the data read from the word-line, at 612. For example, the stored prior count 136 of FIG. 1 may be compared to the count 114. To illustrate, the correction module 130 may compare the count 114 to the stored prior count 136, such as by performing a subtraction operation, a bit-wise comparison operation, or another operation to determine a difference between the count 114 and the stored prior count 136.

A number of bits to correct may be determined from the comparison, at 614. To illustrate, a "1" value may be corrected to be a "0" value, or a "0" value may be replaced with a "1" value. In an example, the number of bits to correct 148 of FIG. 1 may be determined by comparing the count 114 of retrieved bits having the particular value to the stored prior count 136. To illustrate, the correction module 130 of FIG. 1 may determine the number 148 of bits to correct as a result of subtracting the count 114 from the stored prior count 136 and assigning the result of the subtraction as the number 148 of bits to correct. A negative value may indicate that one or more bits should be flipped to have the particular value, while a positive value may indicate that one or more bits that have the particular value should be flipped. Alternatively, one or more other processes may be used to determine a sign and magnitude of a difference between the count 114 and the stored prior count 136.

A state of a cell of the memory array may be corrected, at 616. The state may be corrected based on a table lookup. For example, the memory array may include a plurality of multilevel cells, and the error probability tables 138 of FIG. 1 may be used to make a table lookup to change a state of an MLC 144 of the memory array 102. To illustrate, the correction module 130 may access the buffer 162 to identify a bit of the first group 110 for correction using a table lookup. The table lookup may be at least partially based upon a Hamming distance when a number of errors in an MLC is used to determine a likelihood of an error, as described with respect to the tables 350 and 352 of FIG. 3. As another example, the table lookup may be at least partially based upon the count by using the count as a parameter to select a probability table to access, as described with respect to 346 and 348 of FIG. 3. As yet another example, the table lookup may be at least partially based upon a state value, such as based upon a partially corrected bit value of an MLC cell in conjunction with the particular bit value, as described with respect to the tables 354 and 356 of FIG. 3.

Although various components depicted herein are illustrated as block components and described in general terms, such components may include one or more microprocessors, state machines, or other circuits configured to enable the controller 104 of FIG. 1 or the controller 304 of FIG. 3 to perform the particular functions attributed to such components, or any combination thereof. For example, the correction module 130 of FIG. 1, or the ECC engine 318 and correction module 314 of FIG. 3, or any combination thereof, may represent physical components, such as hardware controllers, state machines, logic circuits, or other structures to enable the controller 104 of FIG. 1 or the controller 304 of FIG. 3 to detect and correct an error.

For example, the correction module 130 may be implemented using a microprocessor or microcontroller programmed to analyze the MLC 144 by determining a number of bits to correct. To illustrate, the microprocessor or microcontroller, such as the controller 104, may be programmed to conduct a lookup operation to determine an MLC bit most likely to flip. The controller 104 may flip the determined bit and attempt an ECC operation. Should the data including the bit still be uncorrectable, the controller 104 may select a next bit to be flipped based upon a determined probability associated with the next bit. The correction module 130 may include executable instructions that are executed by the controller 104. Executable instructions that are executed by the controller 104 that may be included in the correction module 130 may be stored at a separate memory location, such as at a read-only memory (ROM) (not shown).

Although various specific values are used in the present disclosure, such values are provided for purpose of illustration rather than of limitation. For example, although MLCs storing three bits are described, MLCs storing two bits, or four or more bits, may be used. As another example, although an ECC correction capability is described as 12 bits for each 512 byte page, other ECC correction capabilities may be used. For example, an ECC correction capability may be greater than 12 bits for each 512 byte word, or less than 12 bits for each 512 byte word, and may be based on word sizes other than 512 bytes, (e.g. 256 bytes, 1024 bytes, or any other word size). Further, an ECC correction capability may vary according to ECC scheme (e.g. Reed-Solomon vs. BCH) and strength (e.g. 12 parity bits/word vs. 16 parity bits/word) as illustrative examples.

Although various embodiments are described as determining probability or likelihood of a bit value being erroneous, such as via the lookup tables 312 of FIG. 3, in other embodiments a likelihood or probability of a bit value being correct may be used. For example, one or more probability tables may be used that indicates a likelihood or other indicator that a particular bit has a correct value. A determination of a bit to flip in an uncorrected group of bits may include locating a smallest value returned from a table lookup, indicating a lowest confidence that the corresponding bit is correct.

Various embodiments are described in terms of word-lines containing multiple pages that are independently decodable at an ECC engine, pages logically divided into groups of bits, and a count of 1's (or 0's) stored for each group within an identified page. However, in other embodiments a word-line may contain a single page, and the word-line may be a smallest unit of data that is independently decodable at the ECC (e.g. a single codeword). Alternatively, or in addition, a group of bits (corresponding to a stored count) may include one or more pages, such as when word-line partitioning into logical groups is based on error density and a particular page is relatively error-free, resulting in the entire page being in a single group. Although grouping of bits within pages or word-lines is described to generate counts of 1's (or 0's) for each group to be stored and used during a later read operation, in some embodiments a portion but not all of a page or a word-line may be logically divided into groups. For example, bits within a central region or an end region of a word-line or a page (or other unit of storage) may be assigned to groups and stored counts, while bits within remaining region(s) of the word-line or page may not be assigned to a group.

The systems depicted in FIGS. 1 and 3, such as the controller 104 coupled to the memory array 102 of FIG. 1, may be implemented as a portable device configured to be selectively coupled to one or more external devices, such as the external device 106. However, in other embodiments, the controller 104 and the memory array 102 of FIG. 1 may be attached or embedded within one or more host devices, such as within a housing of a portable communication device. For example, the controller 104 and the memory array 102 of FIG. 1 may be within a packaged apparatus such as a wireless telephone, personal digital assistant (PDA), gaming device or console, portable navigation device, or other device that uses internal non-volatile memory. The memory array 102 may include a non-volatile memory, such as a flash memory (e.g., NAND, NOR, Multi-Level Cell (MLC), Divided bit-line NOR (DINOR), AND, high capacitive coupling ratio (HiCR), asymmetrical contactless transistor (ACT), or other flash memories), an erasable programmable read-only memory (EPROM), an electrically-erasable programmable read-only memory (EEPROM), a read-only memory (ROM), a one-time programmable memory (OTP), or any other type of memory.

The illustrations of the embodiments described herein are intended to provide a general understanding of the various embodiments. Other embodiments may be utilized and derived from the disclosure, such that structural and logical substitutions and changes may be made without departing from the scope of the disclosure. This disclosure is intended to cover any and all subsequent adaptations or variations of various embodiments.

The above-disclosed subject matter is to be considered illustrative, and not restrictive, and the appended claims are intended to cover all such modifications, enhancements, and other embodiments, which fall within the scope of the present disclosure. Thus, to the maximum extent allowed, the scope of the present invention is to be determined by the broadest permissible interpretation of the following claims and their equivalents, and shall not be restricted or limited by the foregoing detailed description.

What is claimed is:

1. A method comprising:
   at a controller coupled to a memory array:
      receiving an indication that a first group of data bits read from the memory array includes errors that are uncorrectable by an error correction coding (ECC) engine, wherein the first group of bits corresponds to multiple bits of a word-line of the memory array;
      comparing a count of the first group of data bits having a particular bit value to a prior count of data bits having the particular bit value;
      in response to determining that the count exceeds the prior count, identifying a bit of the first group of data bits that has the particular bit value and that corresponds to a same memory cell as a corrected data bit of a second group of data bits;

changing a value of the identified bit of the first group to generate an adjusted group of data bits; and providing the adjusted group of data bits to the ECC engine.

2. The method of claim 1, wherein the memory array comprises a plurality of multi-level cells.

3. The method of claim 1, further comprising selecting the identified bit based upon a table lookup.

4. The method of claim 3, wherein the table lookup is at least partially based upon a Hamming distance.

5. The method of claim 3, wherein the table lookup is at least partially based upon the count.

6. The method of claim 3, wherein the table lookup is at least partially based upon a state value.

7. The method of claim 1, further comprising determining a number of bits to flip in the first group.

8. The method of claim 1, further comprising iteratively flipping bits in the first group until the ECC engine determines that the first group is correctable.

9. A method comprising:
at a controller coupled to a memory array:
storing a first count of bits of a group of bits that are identified as having a particular bit value, the group of bits corresponding to at least a portion of a word-line of the memory array; and
in response to a read of the word-line resulting in data that is uncorrectable by an error correcting code (ECC) engine:
retrieving the first count;
comparing the first count to a second count of bits having the particular bit value, the second count determined based on the data read from the word-line; and
determining from the comparison a number of bits to correct.

10. The method of claim 9, further comprising increasing a number of counts associated with the word-line as a number of errors in the word-line increases.

11. The method of claim 10, further comprising determining the number of counts such that only one of a one-changed-to-zero error and a zero-changed-to-one error occurs within the group of bits.

12. The method of claim 9, further comprising storing the first count in a log file within the memory array.

13. The method of claim 9, further comprising receiving an indication that the word-line has a number of errors exceeding a threshold number of errors and storing the first count in response to receiving the indication.

14. The method of claim 9, wherein the first count of bits is stored at the controller or at the memory array.

15. The method of claim 9, wherein the memory array comprises a plurality of multi-level cells.

16. The method of claim 9, further comprising correcting a state of a cell of the memory array.

17. The method of claim 16, further comprising correcting the state based upon a table lookup.

18. The method of claim 17, wherein the table lookup is at least partially based upon at least one of a Hamming distance and the second count.

19. A memory device comprising:
a memory array;
at least one error probability table to store data indicating likelihood of an error of a particular bit of a multi-bit value of a memory cell of the memory array, the data at least partially based on a number of errors of other bits of the memory cell; and
a controller coupled to the memory array, the controller including an error correction coding (ECC) engine configured to detect the errors of the other bits of the memory cell, wherein the controller is configured to determine a number of bits of a particular value to correct, the bits retrieved via a read operation at the memory array, the number of bits determined based on comparing a count of retrieved bits having the particular value to a stored count of bit values, wherein the retrieved bits correspond to multiple bits of a word-line of the memory array, the controller further configured to access the at least one error probability table to identify at least one bit for correction.

20. The memory device of claim 19, wherein the at least one error probability table is indexed by a Hamming distance from a read value to a partially corrected value.

21. The memory device of claim 19, wherein the at least one error probability table is indexed by a partially corrected value.

22. The memory device of claim 19, wherein the at least one error probability table is stored at the controller.

23. The memory device of claim 19, wherein the at least one error probability table is stored at the memory array.

24. The memory device of claim 19, wherein the stored count is stored in a memory at the controller.

25. The memory device of claim 19, wherein the stored count is stored at the memory array.

26. The memory device of claim 19, wherein the memory array includes a flash multi-level cell array.

* * * * *